United States Patent [19]

Coblenz et al.

[11] Patent Number: 4,771,950

[45] Date of Patent: Sep. 20, 1988

[54] HYDROTHERMAL COMMINUTION OR ZIRCONIA OR HAFNIA

[75] Inventors: William S. Coblenz, Hudson, Mass.; Paul J. Pelletier, Thompson, Conn.; Guilio A. Rossi, Shrewsbury, Mass.

[73] Assignee: Norton Company, Worcester, Mass.

[21] Appl. No.: 69,735

[22] Filed: Jul. 6, 1987

[51] Int. Cl.$^4$ ............................................. B02C 19/12
[52] U.S. Cl. ......................................... 241/1; 241/23; 241/29; 501/103
[58] Field of Search ................... 241/1, 301, 5, 23, 65, 241/29; 501/103, 104

[56] References Cited

U.S. PATENT DOCUMENTS 4,501,818  2/1985  Rossi .
4,565,792  1/1986  Knapp .

OTHER PUBLICATIONS

Yoshimura et al., "Role of H$_2$O on the Degradation Process of Y–TZP", Journal of Materials Science Letters, vol. 6, pp. 465–467 (1987).

*Primary Examiner*—Mark Rosenbaum
*Attorney, Agent, or Firm*—Norvell E. Wisdom, Jr.

[57] ABSTRACT

Zirconia ceramics containing substantial amounts of metastable tetragonal phase crystallites, so that they are tougher than most other ceramics, can be completely comminuted to powders, without applying any mechanical force, by treatment with water or steam at temperatures well above room temperature. This type of comminution is particularly useful for small, often hollow, spheres produced by rapidly solidifying melts of zirconia and a stabilizing oxide such as yttria. These spheres can be almost completely comminuted to a size suitable for wet vibratory milling by treatment for twenty-four hours at 250 C under sufficient steam pressure to maintain some liquid water in equilibrium.

15 Claims, No Drawings

HYDROTHERMAL COMMINUTION OR ZIRCONIA OR HAFNIA

TECHNICAL FIELD

This invention relates to a class of materials comprising substantial amounts of small crystals of tetragonal phase zirconia and/or hafnia, which at room temperature is in a metastable state and is capable of rapidly transforming to a monoclinic crystal phase under mechanical stresses such as grinding. For purposes of this application, this class will be designated as "meta-stabilized zirconia(s)" or "MSZ('s)". This class includes materials generally known in the ceramic arts as partially stabilized zirconia or PSZ's and as tetragonal zirconia polycrystals or TZP's.

MSZ's have relatively high toughness for ceramics. This toughness is often ascribed to the transformation of tetragonal crystals to monoclinic ones under the mechanical stress of any propagating crack tips. Because the monoclinic phase of zirconia or hafnia is less dense than the tetragonal one, a volume expansion occurs on transformation, retarding the further propagation of any cracks.

The same toughness which makes MSZ's valuable in uses that require resistance to cracking makes them difficult to reduce into fine powders, an often necessary step in practical ceramic processing, by the usual mechanical methods of crushing, milling, or grinding. This invention is particularly related to methods for comminuting MSZ powders that require less mechanical work than conventional methods and reduce contamination.

TECHNICAL BACKGROUND

It is well known in the art that MSZ compositions can be obtained by mixing zirconia or hafnia with appropriate amounts of other metal oxides known as the stabilizing oxides. The most used stabilizing oxides are rare earth and/or alkaline earth oxides, especially yttria and magnesia. The needed intimate mixing between the zirconia and the stabilizing oxide, along with the needed type and size of crystallites in the product, may be obtained by precipitating from solution, as exemplified by U.S. Pat. No. 4,501,818 of Feb. 26, 1985 to Rossi, or by rapid solidification from a melt, as described in U.S. Pat. No. 4,565,792 of Jan. 21, 1986 to Knapp, the entire specification of which is hereby incorporated herein by reference.

The rapid solidification process produces an initial product that consists primarily of hollow small spheres from 30 to 6500 microns in diameter, with a median diameter of about 2000 microns. This initial product is denoted hereinafter as "rapidly solidified crude" or "RS crude".

The preferred method of final comminution of the MSZ produced by rapid solidification is wet vibratory milling, such as that as accomplished by a commercial Sweco mill. This milling step produces a final average particle size of less than 2 microns. The vibratory mill, however, can not effectively be used directly on much of the RS crude, because the mill operates efficiently only on particles about eight hundred microns or less in size. An intermediate comminution step is thus needed before vibratory milling.

As taught in U.S. Pat. No. 4,565,792, this intermediate step was performed by conventional mechanical crushing. While this method was adequate, it sometimes was found to introduce undesirable levels of metallic and other impurities that would reduce the toughness of final objects made from the MSZ powders subsequently produced. An object of this invention is to provide an improved method for this intermediate comminution. The method also can be useful for recycling rejected or broken sintered objects of MSZ, thereby recovering the fairly expensive zirconia content without requiring the energy expenditure for remelting.

Beginning in 1981, reports have appeared in the non-patent literature that sintered bodies made from MSZ's were susceptible to substantial reductions in toughness, and sometimes even to loss of integrity, when aged at temperatures above 100 C. in water or between about 150 and 400 C. in air. These reports are summarized, and the latest work of this type known to the applicants is reported, in M. Yoshimura et al., "Role of $H_2O$ on the degradation process of Y-TZP", 6 *Journal of Materials Science Letters* 465–67 (1987). ("Y-TZP" in this title indicates that yttria is the stabilizing oxide.)

SUMMARY OF THE INVENTION

It has been found that sufficiently high temperature water and/or steam treatment of macroscopic objects of MSZ, without any external direct mechanical force at all, comminutes the MSZ objects into particles having weighted average longest dimensions not more than one half as much as the weighted average longest dimensions of the initial macroscopic objects. For the purposes of this invention, "macroscopic" means that objects have either weighted average longest dimensions of at least 25 microns or a specific surface area of no more than 800 $cm^2/g$ as measured by the BET method with krypton gas, and the weighted average longest dimensions for a group of objects or particles (which group may be a single object or particle) is defined as the number obtained by multiplying the weight of each separate coherent object or particle in the group by the longest dimension for that object or particle, summing all these products, and dividing this sum by the total weight of the group of objects or particles.

This invention is particularly effective for the comminution of rapidly solidified MSZ crude to a size appropriate for subsequent efficient vibratory wet milling.

DESCRIPTION OF THE PREFERRED EMBODIMENTS

Usually, distilled or otherwise purified water is the preferred liquid to use for hydrothermal treatment according to this invention. In certain cases, however, it is advantageous to add some base, preferably ammonium hydroxide, to the water to guard against the possibility of selective dissolution of rare earth stabilizing oxide(s) from the product to be comminuted.

Substantial spontaneous comminution can be achieved by treatment at a temperature as low as 135 C. for forty hours. Most preferably, however, the temperature should be at least 250 C. and the steam pressure during treatment should be at least the equilibrium pressure for maintaining some liquid water at that temperature, i.e., about 4 megapascals (MPa). Under such conditions, complete comminution of the sample, defined as the ability to pass at least 99% of the sample through a 20 mesh screen, can be achieved with 24 hours of treatment. Higher temperatures and pressures and longer times can be used without any deleterious affect on the powders produced, but they increase the cost of the process and are less preferable for that reason. Under certain operating conditions, lower temperatures and pressures may be preferable to keep the cost of equipment to a reasonable level, even though longer times of hydrothermal treatment, or possibly even recycling of the insufficiently comminuted fraction to additional stages of treatment, might be required under these conditions. Various possibilities are given in the examples below, and others will be apparent to those skilled in the art.

EXAMPLES 1-15

For these examples a small laboratory autoclave was used. Its pressure chamber was a length of stainless steel pipe about 27 cm long and 10 cm in inside diameter. The pressure chamber was loaded with RS crude to a depth of about 18 cm. For some of the examples, as specified in Table I, the naturally resulting distribution of particle sizes in RS crude was used, while for others either particles larger than 6 mm in diameter, referred to as "large", or particles smaller than 0.17 mm in diameter, referred to as "small", were used exclusively.

Sufficient distilled water to assure the presence of at least some liquid at the intended temperature of treatment was then added to the pressure chamber, and the latter closed and then heated to the test temperature. If less than the equilibrium pressure for the temperature was desired, steam was vented from the autoclave after it reached the test temperature to reduce the pressure to the desired level.

After hydrothermal treatment for the desired time, the autoclave was cooled and vented, (alternatively, venting before cooling could equally well be used), and the contents were dried by heating in an oven for 24 hours at 105 C. The effect of the hydrothermal treatment was evaluated by various techniques, and it was concluded that measurement of specific surface area, using the BET technique with krypton gas, gave the most useful convenient characterization of the particle size reduction achieved.

No Y was detected by atomic absorption, which would have detected as little as 0.3 parts per million. This indicates there was no significant extraction from the MSZ during hydrothermal treatment. Also, after this example, the median particle size of the particles produced was about 40 microns, and at least 99% by weight of the charge to the autoclave passed through a 20 mesh screen and thus was suitable for wet vibratory milling.

EXAMPLE 16-18

In these examples, hydrothermal treatment was applied to sintered bulk MSZ material with dimensions of about 3-4 mm width and height and 20-35 mm length. For Example 16, the sample was made from rapidly solidified Y-TZP with about 4.1 weight per cent yttria and was sintered at 1600 C. for one hour; for Example 17, the sample was made from similar powder as Example 16 but was sintered at 1500 C. for ninety minutes; for Example 18, the sample was a magnesia stabilized MSZ with about 2.5 weight percent magnesia and was sintered at 1600 C. for about one hour while buried in powder of the same composition as the cold-pressed sample. In all these examples, the initial sample was free from any cracks observable under a microscope with 40 power magnification and had a density of at least 95% of theoretical.

Each of the MSZ samples described above was placed in an autoclave similar to that described for Examples 1-15, but smaller in size, and sufficient distilled water was added to the autoclave to allow some liquid to remain at 200 C., to which the autoclave was heated after closing it. At this temperature, the equilibrium steam pressure is about 4 MPa. The samples were left exposed at this temperature for about 24 hours, and the autoclave then cooled and the samples removed for examination. The sample from example 16 was noticeably cracked all over and could easily be broken by hand, while the other two were still too strong to break

TABLE I

Conditions and Results of Treatment of Rapidly Solidified Crude

| Example No. | Composition and Size of RS Crude | Temp. (°C.) | Pressure (PSIG) | Time (hrs.) | BET Surface Area (cm2/gm) |
|---|---|---|---|---|---|
|  | 4.1 wt. % Y2O3; as made | untreated | untreated | untreated | 86 |
| 1 | 4.1 wt. % Y2O3; as made | 135 | 45 | 40 | 277 |
| 2 | 4.8 wt. % Y2O3; as made | 200 | 225 | 15 | 890 |
| 3 | 4.1 wt. % Y2O3; as made | 200 | 225 | 24 | 1194 |
| 4 | 4.8 wt. % Y2O3; as made | 225 | 370 | 20 | 1774 |
| 5 | 4.1 wt. % Y2O3; small | 250 | 14.7 | 24 | 138 |
| 6 | 4.1 wt. % Y2O3; large | 250 | 14.7 | 24 | 43 |
| 7 | 4.1 wt. % Y2O3; as made | 250 followed by | 300 14.7 | 1 23 | 1087 |
| 8 | 4.1 wt. % Y2O3; as made | 250 | 260 | 24 | 1125 |
| 9 | 4.1 wt. % Y2O3; as made | 250 | 575 | 2 | 625 |
| 10 | 4.1 wt. % Y2O3; as made | 250 | 575 | 5 | 1195 |
| 11 | 4.1 wt. % Y2O3; as made | 250 | 575 | 10 | 1495 |
| 12 | 4.1 wt. % Y2O3; as made | 250 | 575 | 15 | 3069 |
| 13 | 4.1 wt. % Y2O3; as made | 250 | 575 | 24 | 3460 |
| 14 | 4.8 wt. % Y2O3; as made | 250 | 575 | 36 | 3000 |
| 15 | 4.1 wt. % Y2O3; as made | 268 | 780 | 32 | 3857 |

Table I shows the yttria content, RS crude size, temperature, pressure, and time of hydrothermal treatment, and the resulting specific surface area for the comminuted MSZ for Examples 1-15, as well as the specific surface area for untreated RS crude. Values of specific surface area of 3000 cm2/g or more in this table correspond to complete comminution as defined above.

After Example 13, the liquid remaining in the autoclave after cooling was analyzed to determine whether any of the constituents of the MSZ had been extracted.

by hand and had no cracks visible under 40 power magnification.

The samples for Examples 17 and 18 were then returned to the autoclave. Enough water was added to the autoclave to assure the presence of some liquid water at 250 C., and the autoclave was heated to that temperature after closing it. The autoclave was left at 250 C. for about 24 hours, then cooled to room temperature. Examination indicated that the sample for Example 17 had completely disintegrated to powder after this treatment. The powder is suitable for input to a vibratory mill for further comminution prior to reuse. The sample for Example 18 was conspicuously cracked by the treatment at 250 C. and could easily be broken by hand. Further hydrothermal treatment of the samples for either Examples 16 or 18 should also make them suitable for input to a vibratory mill for final comminution prior to reuse.

EXAMPLE 19

A sample of commercial Y-TZP type powder from Toyo Soda, believed to be derived from chemical precipitation, was pressed and then sintered at 1500 C. for three hours into a parallelepiped greater than 1 mm in each dimension. The parallelepiped was exposed to water and steam in the same autoclave as used for Examples 16– 18 at 250 C. for 24 hours, and after this treatment was completely disintegrated to powder particles no more than 100 microns in size.

What is claimed is:

1. A process for the comminution of initially macroscopic objects of metastabilized zirconia, comprising exposing said objects to water at sufficiently high temperature and pressure for a sufficient time to cause said objects to disintegrate spontaneously into particles having weighted average longest dimensions not more than one half as much as the weighted average longest dimensions of said initially macroscopic objects.

2. A process according to claim 1, wherein said initially macroscopic objects are rapidly solidified crude.

3. A process according to claim 2, wherein at least 99% of said particles will pass through a 20 mesh screen.

4. A process according to claim 3, wherein said temperature is at least 250 C., said pressure is at least the equilibrium vapor pressure of water at 250 C., and said time is at least twenty-four hours.

5. A process according to claim 4, wherein the median particle size of said particles is not more than 100 microns.

6. A process for recycling a macroscopic object of metastabilized zirconia (MSZ), comprising the steps of:

(a) exposing said object to water at sufficiently high temperature and pressure for a sufficient time to cause said object to disintegrate spontaneously into particles having weighted average longest dimensions not more than one half as much as the weighted average longest dimension of said macroscopic object; and (b) densifying by application of pressure and heat at least a portion of the particles obtained in step (a) into a new macroscopic object of MSZ.

7. A process according to claim 6, additionally comprising a step of comminuting by wet vibratory milling the particles obtained in step (a).

8. A process according to claim 6, wherein said objects have an actual density of at least 95% of the theoretical maximum density for their chemical composition and crystal structure.

9. A process according to claim 8, additionally comprising a step of comminuting by wet vibratory milling the particles obtained in step (a).

10. A process according to claim 8, wherein said exposing comprises exposure for at least twenty-four hours at 250 C. to at least the equilibrium vapor pressure of water at 250 C.

11. A process according to claim 10, additionally comprising a step of comminuting by wet vibratory milling the particles obtained in step (a).

12. A process according to claim 8, wherein said exposing comprises exposure for at least twenty-four hours at 200 C. to at least the equilibrium vapor pressure of water at 200 C.

13. A process according to claim 12, wherein said exposing additionally comprises exposure for at least twenty-four hours at 250 C. to at least the equilibrium water vapor pressure at 250 C. after said exposure for at least twenty-four hours at 200 C. to at least the equilibrium water vapor pressure at 200 C.

14. A process according to claim 13, additionally comprising a step of comminuting by wet vibratory milling the particles obtained in step (a).

15. A process according to claim 12, additionally comprising a step of comminuting by wet vibratory milling the particles obtained in step (a).

* * * * *

UNITED STATES PATENT AND TRADEMARK OFFICE
CERTIFICATE OF CORRECTION

PATENT NO. : 4,771,950
DATED : September 20, 1988
INVENTOR(S) : William S. Coblenz, Paul J. Pelletier, Guilio A. Rossi It is certified that error appears in the above-identified patent and that said Letters Patent is hereby corrected as shown below:

On the title page and column 1, line 2:

In the title of the invention "OR" should read --OF--

Signed and Sealed this

Second Day of April, 1991

Attest:

HARRY F. MANBECK, JR.

Attesting Officer

Commissioner of Patents and Trademarks